Patented Sept. 25, 1934

1,974,808

UNITED STATES PATENT OFFICE 1,974,808

PROCESS OF PRODUCING FLOUR

Carl F. Dietz, Minneapolis, Minn., assignor to Commander - Larabee Corporation, Minneapolis, Minn., a corporation of Maryland No Drawing. Application February 16, 1931, Serial No. 516,226

2 Claims. (Cl. 99—10)

It is the object of this invention to provide a method or process of producing flour from any germ bearing cereal grain which shall contain vitamin A, known as fat-soluble A, vitamin B, known as the growth-promoting water-soluble vitamin, and vitamin D, known as the antirachitic vitamin.

In describing my process, I will refer particularly to the production of wheat flour, but it is to be understood that the process may equally well be carried out in the production of flour from corn, rye and other germ bearing cereal grains.

Wheat germ is one of the most prolific carriers of vitamin B and is also a good carrier of vitamin A. However, in milling flour, as generally practiced, the wheat germ is extracted and largely goes into cattle feed and the like, and it is also used for pharmaceutical purposes. This is so because the introduction of the wheat germ, as such, into flour tends, by reason of the relatively large quantity of germ oil, to make the flour rancid and to affect its color and texture.

By my process, flour may be produced which contains the vitamins A and B of the wheat germ, as well as the valuable mineral salts of the germ, and, in addition, vitamin D, introduced as will presently be described. The incorporation of activated wheat germ into flour in accordance with my process does not materially affect the color or texture of the flour or impair its baking qualities.

It has been discovered that various food materials may be given antirachitic properties, that is to say, activated with vitamin D, by suitable ultra-violet irradiation. It has been proposed to activate finished flour with vitamin D but such a process would not only be expensive but the flour would have only a very low degree of activatability because of the lack of oils or fats due to the separation of the wheat germ in the milling process. Even if flour were so activated, it would not contain vitamins A and B and the valuable mineral salts of the wheat germ.

In carrying out my process, the wheat germ is first separated from the wheat berry by any convenient form of milling apparatus, comprising, generally, sets of crushing rolls, purifiers and sifters which operate to open the berry and subsequently permit separation of the germ, flour and bran into these respective products. After the wheat germ has been separated, it may be subjected to the action of suitable crushing apparatus to reduce it to a fine crushed condition.

Having prepared the wheat germ in the manner described, I may activate it with vitamin D by subjecting it to suitable ultra-violet irradiation, as for example, by sunlight concentrated by means of reflectors and quartz glass filtration, or by mercury vapor lamps. The wheat germ will contain a relatively high potency in vitamin D in addition to its natural vitamins A and B and may be directly introduced into flour prepared in any usual manner.

Because of the presence in the wheat germ of a considerable quantity of germ oil, approximately 15%, which tends to produce rancidity, it is desirable to activate such germ to a high degree of potency which when mixed with substantially deoiled germ and introduced into flour, will practically eliminate the rancidity danger. By this process, the flour will contain not only the three vitamins, A, B and D, but also the highly valuable mineral salts contained in the solid portion of the germ. Indeed, the activation of the germ oil with vitamin D will increase the usefulness of these mineral salts which are, principally, calcium, phosphorus, sodium and magnesium.

The oil may be removed, in varying proportions, from the wheat germ by any suitable process employing mechanical or other means of extraction. For example, the germ may be crushed by mechanical pressure in any suitable machine which would result in the removal of the desired proportion of the oil. To extract substantially all of the oil, chemical fat solvents may be employed; for example, the fats may be dissolved in ether or any other suitable solvent. It has been found that the removal of the oil does not affect the residue of the germ as a carrier of vitamin B or diminish the natural mineral salts.

A practical manner of carrying out my process is as follows: Finely crushed germ obtained as heretofore described is activated with vitamin D and mixed with deoiled germ, in any desired proportion, and the mixture introduced into the flour stream, say up to 2%, by weight. The oil of the activated crushed germ as a high potency carrier of vitamin D will be effective within the range of rancidity action in the flour. Moreover, because of the relatively small quantity of oil introduced, there will be no deleterious effect upon color or texture, nor will the baking qualities be impaired.

My process may also be carried out as follows: The oil is extracted from the germ and activated to a high potency in vitamin D and the activated oil is then mixed with the residue of the germ in any desired proportion. The resultant mixture is then introduced into the flour stream in small quantities, for example, 2% by weight. Germ oil is of a reddish brown color and, before activation, it may be desirable to extract the carotin matter by means of any suitable decolorizing agent.

Those skilled in the art will readily appreciate that the process herein described for the production of wheat flour may also be carried out in the production of flour from corn, rye and other germ bearing cereal grains.

I claim as my invention:

1. The process of producing flour from a germ bearing cereal grain which includes the steps of separating the germ from the grain, milling the residue of the grain into flour, extracting the oil from said germ, activating the oil with vitamin D, mixing the activated oil with the residue of said germ, and incorporating the resultant mixture with the flour.

2. The process of producing flour from a germ bearing cereal grain which includes the steps of separating the germ from the grain, milling the residue of grain into flour, extracting the oil from said germ, decolorizing said oil, activating said oil with vitamin D, and incorporating said activated oil with the flour.

CARL F. DIETZ.